(12) United States Patent
Binner et al.

(10) Patent No.: US 11,211,206 B2
(45) Date of Patent: Dec. 28, 2021

(54) CHARGING MECHANISM FOR CHARGING A STORED-ENERGY SPRING OF A STORED-ENERGY SPRING MECHANISM

(71) Applicant: SIEMENS AKTIENGESELLSCHAFT, Munich (DE)

(72) Inventors: Lukas Binner, Berlin (DE); Friedrich Loebner, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/956,680

(22) PCT Filed: Nov. 22, 2018

(86) PCT No.: PCT/EP2018/082189
§ 371 (c)(1),
(2) Date: Jun. 22, 2020

(87) PCT Pub. No.: WO2019/120853
PCT Pub. Date: Jun. 27, 2019

(65) Prior Publication Data
US 2020/0328035 A1 Oct. 15, 2020

(30) Foreign Application Priority Data

Dec. 20, 2017 (DE) .......................... 102017223357

(51) Int. Cl.
*F16D 41/18* (2006.01)
*F16D 7/04* (2006.01)
(Continued)

(52) U.S. Cl.
CPC ........... *H01H 3/3021* (2013.01); *F16D 7/044* (2013.01); *F16D 41/185* (2013.01); *F16H 33/06* (2013.01);
(Continued)

(58) Field of Classification Search
USPC ........................................................ 200/400
See application file for complete search history.

(56) References Cited

U.S. PATENT DOCUMENTS 4,740,868 A * 4/1988 Hawkins ........... H01L 23/49541
174/536
2016/0240330 A1 * 8/2016 Huang .................... F16D 23/12
2017/0343089 A1 11/2017 Bartz et al.

FOREIGN PATENT DOCUMENTS

CN 201956270 * 8/2011
CN 201956270 U 8/2011
(Continued)

OTHER PUBLICATIONS

Haberhauer, Horst et al: "Maschinenelemente—Gestaltung, Berechnung, Anwendung", Item 4.4 Kupplungen, pp. 397-398, Dec. 31, 2007 (Dec. 31, 2007), Springer Verlag, Berlin, Heidelberg, New York, XP055817334, ISBN: 978-3-540-41262-5—English translation.

*Primary Examiner* — Toan T Vu
*Assistant Examiner* — Xuan Ly
(74) *Attorney, Agent, or Firm* — Laurence A. Greenberg; Werner H. Stemer; Ralph E. Locher (57) ABSTRACT

A charging mechanism for charging a stored-energy spring of a stored-energy spring mechanism includes a charging gear coupled to the stored-energy spring, an intermediate shaft coupled to the charging gear, an idler gear that can be driven by a charging motor, a freewheel coupled to the idler gear, and a dog clutch that couples the freewheel to the intermediate shaft in order to charge the stored-energy spring and uncouples same from the intermediate shaft in the charged state of the stored-energy spring. The dog clutch has a first clutch block coupled to the intermediate shaft for conjoint rotation, and a second clutch block connected to the freewheel. The first clutch block can be displaced along an axis of rotation of the intermediate shaft between two end
(Continued)

positions and, in an intermediate position between the end positions can be freely rotated only in a direction of rotation with respect to the second clutch block.

14 Claims, 4 Drawing Sheets

(51) Int. Cl.
*F16H 33/06* (2006.01)
*H01H 3/30* (2006.01)

(52) U.S. Cl.
CPC ... *H01H 3/3031* (2013.01); *H01H 2003/3036* (2013.01)

(56) References Cited

FOREIGN PATENT DOCUMENTS

| | | | |
|---|---|---|---|
| DE | 102014224405 | * | 6/2016 |
| DE | 102014224405 A1 | | 6/2016 |
| EP | 2940705 | * | 11/2015 |
| EP | 2940705 A1 | | 11/2015 |

* cited by examiner

CHARGING MECHANISM FOR CHARGING A STORED-ENERGY SPRING OF A STORED-ENERGY SPRING MECHANISM

BACKGROUND OF THE INVENTION

Field of the Invention

The invention relates to a tensioning mechanism for tensioning an accumulator spring of a spring stored energy mechanism, in particular for a circuit breaker.

Spring stored energy mechanisms are used, in particular, as drives for switching circuit breakers. Circuit breakers are electric switches which are designed for high electric currents and voltages, in order for it to be possible, in particular, for high overload currents and short circuit currents to be switched off safely. To this end, circuit breakers have an interrupter unit with at least one movable switching element for opening and closing a current path. In order to move the switching elements in the case of a switching operation, circuit breakers provide energy which is required for the switching operation. Spring stored energy mechanisms store said energy in accumulator springs which are tensioned in order to store the energy. An accumulator spring is tensioned, for example, by way of a tensioning motor which is connected via a tensioning mechanism to the accumulator spring. In an analogous manner, spring stored energy mechanisms are also used, for example, as drives for switching load break switches.

SUMMARY OF THE INVENTION

The invention is based on the object of specifying an improved tensioning mechanism for tensioning an accumulator spring of a spring stored energy mechanism.

According to the invention, the object is achieved by way of the features as claimed.

Advantageous refinements of the invention are the subject matter of the dependent claims.

A tensioning mechanism according to the invention for tensioning an accumulator spring of a spring stored energy mechanism comprises a tensioning gear which is coupled to the accumulator spring, an intermediate shaft which is coupled to the tensioning gear, an intermediate gear which can be driven by a tensioning motor, a freewheel which is coupled to the intermediate gear, and a dog clutch which couples the freewheel to the intermediate shaft in order to tension the accumulator spring and decouples it from the intermediate shaft in the tensioned state of the accumulator spring. The dog clutch has a first clutch block which is coupled fixedly to the intermediate shaft so as to rotate with it and a second clutch block which is connected to the freewheel. The first clutch block can be displaced between two end positions along a rotational axis of the intermediate shaft, and has a plurality of first dogs which face the second clutch block and are arranged around the intermediate shaft. The second clutch block has a plurality of second dogs which face the first clutch block. In an intermediate position of the first clutch block which lies between the two end positions, each second dog protrudes into an intermediate space between two first dogs which are adjacent with respect to it and has a stop face for one of said two first dogs, on which stop face a side face of said first dog bears in the case of a rotation of the first clutch block with respect to the second clutch block in a first rotational direction about the rotational axis. The second dog forms a ramp for the other of the two first dogs which are adjacent with respect to it, on which ramp said first dog can slide in the case of a rotation of the first clutch block with respect to the second clutch block in a second rotational direction about the rotational axis, which second rotational direction is opposed to the first rotational direction.

In the case of the tensioning of the accumulator spring, the intermediate shaft transmits rotations of the intermediate gear via the freewheel and the dog clutch to the tensioning gear and, as a result, makes the tensioning of the accumulator spring possible by way of the tensioning motor which drives the intermediate gear directly or indirectly. In the tensioned state of the accumulator spring, the dog clutch decouples the intermediate shaft from the freewheel and the intermediate gear, with the result that no forces are transmitted to the intermediate shaft and the tensioning gear by way of the intermediate gear, in particular in the case of the tensioning motor continuing to run after the tensioning of the accumulator spring. Without the dog clutch, said forces would be transmitted in the tensioned state of the accumulator spring to the intermediate shaft and to components of the tensioning mechanism which are coupled to the intermediate shaft, and would stress and load them. The dog clutch therefore advantageously relieves the intermediate shaft and components of the tensioning mechanism which are coupled to it in the tensioned state of the accumulator spring.

As a result of the fixed coupling of the first clutch block to the intermediate shaft so as to rotate with it, rotations of the intermediate shaft are transmitted to the first clutch block. The displacement capability of the first clutch block makes it possible to couple it to the second clutch block and the freewheel which is connected to the latter in order to tension the accumulator spring, and to decouple the clutch blocks in the tensioned state of the accumulator spring.

The dog clutch makes synchronizing of rotations of the two clutch blocks possible before the dog clutch closes, since the first dogs already come into contact in each case with a second dog in the intermediate position of the first clutch block in the case of rotations of the first clutch block with respect to the second clutch block in a first rotational direction, with the result that the second clutch block is driven by the first clutch block in the case of rotations in the first rotational direction. When the dog clutch closes, the rotations of the two clutch blocks are therefore already synchronized. Here, furthermore, the first dogs in each case always bear flatly against a second dog, namely with a side face against a stop face of the second dog. This advantageously prevents an edge of a dog colliding with another dog, which would lead to wear of the dogs.

Secondly, in the intermediate position of the first clutch block, that is to say in the open state of the dog clutch, the dog clutch makes rotations of the first clutch block possible with respect to the second clutch block in a second rotational direction which is opposed to the first rotational direction, since the second dogs form ramps for the first dogs in the case of said rotations, over which ramps the first dogs can run. As a result, in particular, rotations of the second clutch block are made possible which are caused by way of the tensioning motor continuing to run when, after the tensioning of the accumulator spring, the tensioning gear and the intermediate shaft are fixed and the first clutch block therefore cannot rotate.

One refinement of the invention provides that the first dogs are arranged equidistantly with respect to one another and at an identical spacing from the rotational axis, and that the second dogs are arranged equidistantly with respect to one another and at the same spacing from the rotational axis as the first dogs. As a result, the first dogs can simultaneously bear against in each case one second dog in the case of rotations in the first rotational direction and can run simultaneously over in each case one second dog in the case of rotations in the second rotational direction.

A further refinement of the invention provides that the first clutch block has four first dogs, and the second clutch block has four second dogs. Four dogs per clutch block have proved to be an advantageous compromise between loading of the dogs and a spacing of the dogs of each clutch block, which spacing is required to close the dog clutch. Firstly, the loading of the individual dogs namely increases as the number of dogs decreases. Secondly, a sufficient spacing of the dogs of each clutch block is required in order to close the dog clutch, since the clutch blocks can rotate rapidly relative to one another.

A further refinement of the invention provides a coupling element which is connected to the first clutch block, is guided through a transverse opening in the intermediate shaft, which transverse opening runs perpendicularly with respect to the rotational axis of the intermediate shaft, and can be displaced in the transverse opening parallel to the rotational axis of the intermediate shaft between a first position which defines a first end position of the first clutch block and a second position which defines the second end position of the first clutch block. The coupling element is configured, for example, as a tube or bolt, the longitudinal axis of which is arranged perpendicularly with respect to the rotational axis of the intermediate shaft, and the ends of which protrude into recesses in the first clutch block. The coupling element makes a displacement of the first coupling block by way of a displacement of the coupling element possible.

Furthermore, for example, a switching pin is provided which is mounted displaceably in a longitudinal opening in the intermediate shaft, which longitudinal opening runs along the rotational axis of the intermediate shaft, and is coupled to the coupling element. As a result, the first coupling block can be displaced via the coupling element by way of displacement of the switching pin between its end positions.

Furthermore, it is provided, for example, that a resetting end of the switching pin protrudes out of the longitudinal opening in the intermediate shaft, and a resetting element is arranged on the tensioning gear, which resetting element displaces the resetting end of the switching pin toward the longitudinal opening in the tensioned state of the accumulator spring, with the result that the coupling element is displaced from its first into its second position. For example, the resetting element has a contact end which projects radially from the tensioning gear and has a contact face which bears against the resetting end of the switching pin in the case of the displacement of the latter. By way of the resetting element, the tensioning gear is coupled to the switching pin in a position in which the accumulator spring is tensioned, the resetting element displacing the switching pin and opening the dog clutch as a result.

Each of the two clutch blocks preferably run in an annular manner around the intermediate shaft. As a result, reliable coupling of the dog clutch to the intermediate shaft and the freewheel is made possible in a simple way.

Furthermore, for example, a restoring spring is provided which is coupled to the first clutch block and exerts a spring force on the first clutch block in the direction of the second clutch block. By way of the restoring spring, the first clutch block can be pushed to the second clutch block when the resetting element releases the switching pin in the case of relieving of the accumulator spring. As a result, the dog clutch is closed again, and the tensioning mechanism is ready, after the relieving of the accumulator spring, for renewed tensioning of the accumulator spring.

The freewheel has, for example, a freewheel inner ring which runs around the intermediate shaft and to which the second clutch block is connected. As a result, reliable coupling of the dog clutch to the freewheel is made possible.

The intermediate gear can be driven, for example, via a bevel gear mechanism by way of the tensioning motor. As a result, a deflection of the drive force of the tensioning motor is achieved, which deflection makes a compact overall design of the spring stored energy mechanism possible.

Furthermore, the tensioning mechanism preferably has a locking mechanism for releasably locking the tensioning gear in a tensioned state of the accumulator spring. The locking mechanism has, for example, a cam disk roller, which is connected fixedly to the tensioning gear, and a pawl which fixes the cam disk roller in order to lock the tensioning gear. By way of a locking mechanism of this type, the tensioning gear can be locked in the tensioned state of the accumulator spring, with the result that the accumulator spring remains tensioned until the locking action is released in order to release the energy which is stored by the accumulator spring.

A spring stored energy mechanism according to the invention has a tensioning mechanism according to the invention. The advantages of a spring stored energy mechanism of this type result from the abovementioned advantages of a tensioning mechanism according to the invention.

BRIEF DESCRIPTION OF THE SEVERAL VIEWS OF THE DRAWING

The above-described properties, features and advantages of this invention and the way that they are achieved will become clearer and more comprehensible in conjunction with the following description of exemplary embodiments which will be described in greater detail in conjunction with the drawings, in which.

DETAILED DESCRIPTION OF THE INVENTION

Parts which correspond to one another are provided with the same designations in the figures.

Figure 1:
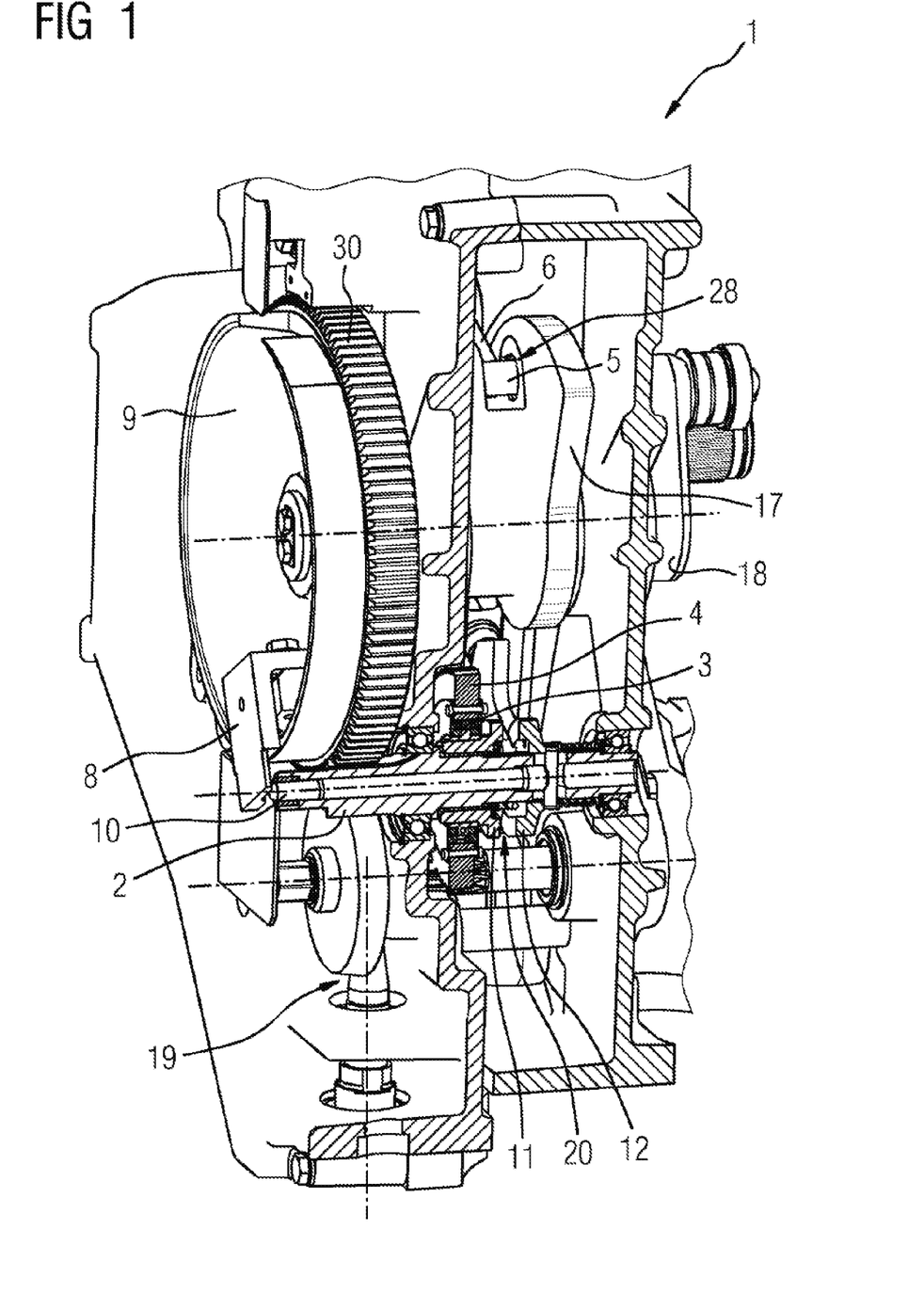
FIG. 1 shows a perspective and partially sectioned illustration of a tensioning mechanism.
Figure 2:
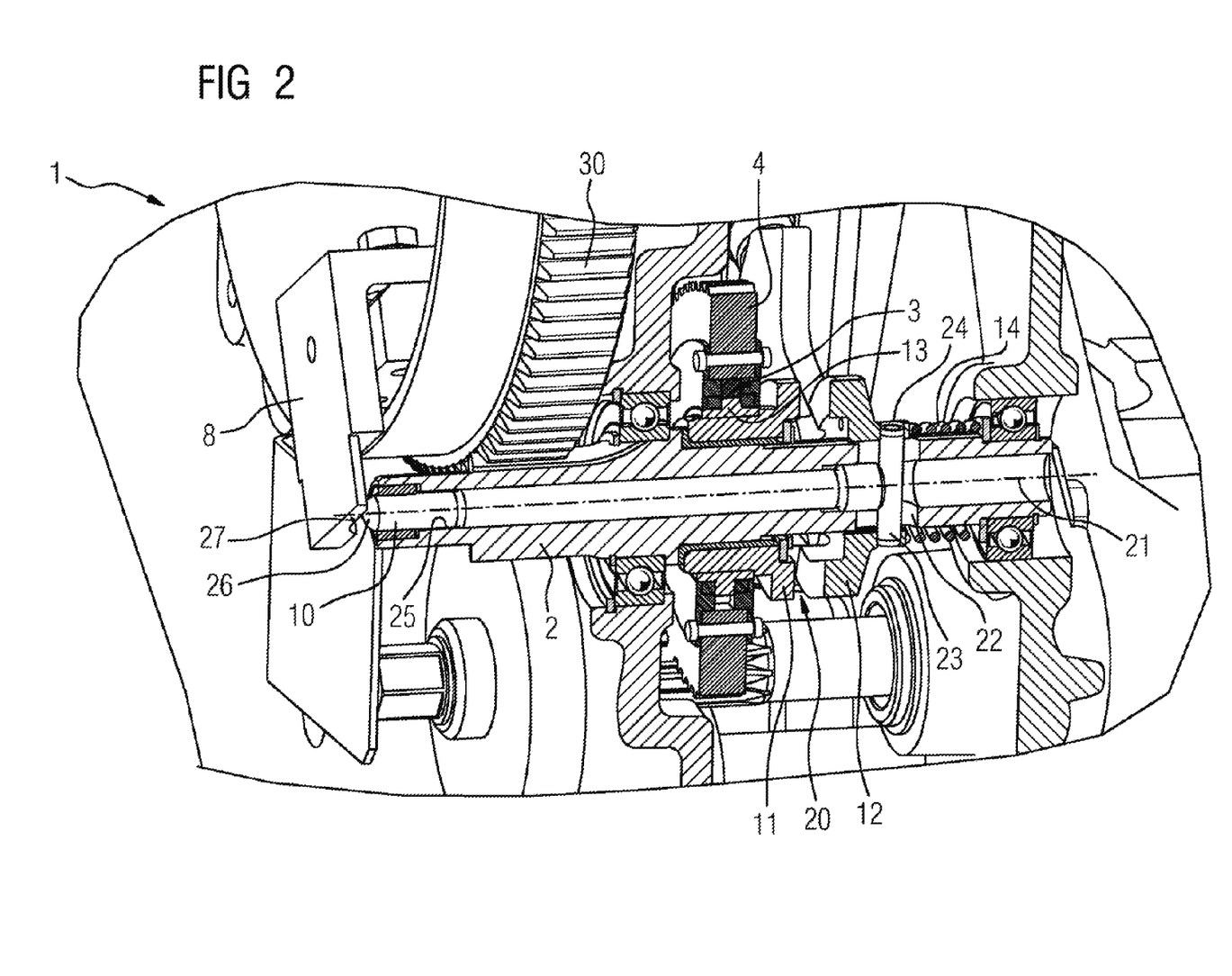
FIG. 2 shows an enlarged detail from FIG. 1.

FIGS. 1 and 2 show a tensioning mechanism 1 for tensioning an accumulator spring (not shown) of a spring stored energy mechanism in a perspective and partially sectioned illustration, FIG. 2 showing an enlarged detail from FIG. 1. The accumulator spring is, for example, a switch-on spring of the spring stored energy mechanism which stores energy for closing a current path of a circuit breaker. The tensioning mechanism 1 comprises, inter alia, a tensioning gear 9, an intermediate shaft 2 and an intermediate gear 4.

The tensioning gear 9 is connected fixedly to a cam disk 17 and a tensioning shaft 18, and is coupled via the tensioning shaft 18 to the accumulator spring.

The intermediate gear 4 can be driven via a bevel gear mechanism 19 by a tensioning motor (not shown).

The intermediate shaft 2 is coupled to the tensioning gear 9 and the intermediate gear 4, in order to transmit rotations of the intermediate gear 4 to the tensioning gear 9 in order to tension the accumulator spring. The coupling between the intermediate shaft 2 and the tensioning gear 9 is a gearwheel coupling which is formed by a toothed rim 30 of the tensioning gear 9 and a gearwheel ring 32 (see FIGS. 3 and 4) of the intermediate shaft 2, which gearwheel ring 32 corresponds to said toothed rim 30.

The intermediate gear 4 is coupled via a freewheel 3 and a dog clutch 20 to the intermediate shaft 2, the freewheel 3 connecting the intermediate gear 4 to the dog clutch 20. The dog clutch 20 has a first clutch block 12 which is coupled fixedly to the intermediate shaft 2 so as to rotate with it, and a second clutch block 11 which is connected to a freewheel inner ring 13 of the freewheel 3. The two clutch blocks 11, 12 run in an annular manner about the intermediate shaft 2.

The first clutch block 12 can be displaced between two end positions axially, that is to say parallel to a rotational axis 21 of the intermediate shaft 2. In a first end position of the first clutch block 12, the dog clutch 20 is closed and couples the freewheel 3 and the intermediate gear 4 to the intermediate shaft 2 (see FIG. 4) in order to tension the accumulator spring. The first clutch block 12 is displaced away from the second clutch block 11 from the first end position to the second end position.

The freewheel 3 decouples the intermediate gear 4 from the intermediate shaft 2 in the case of tensioning of the accumulator spring if the tensioning shaft 18 runs over a top dead center.

Figure 3:
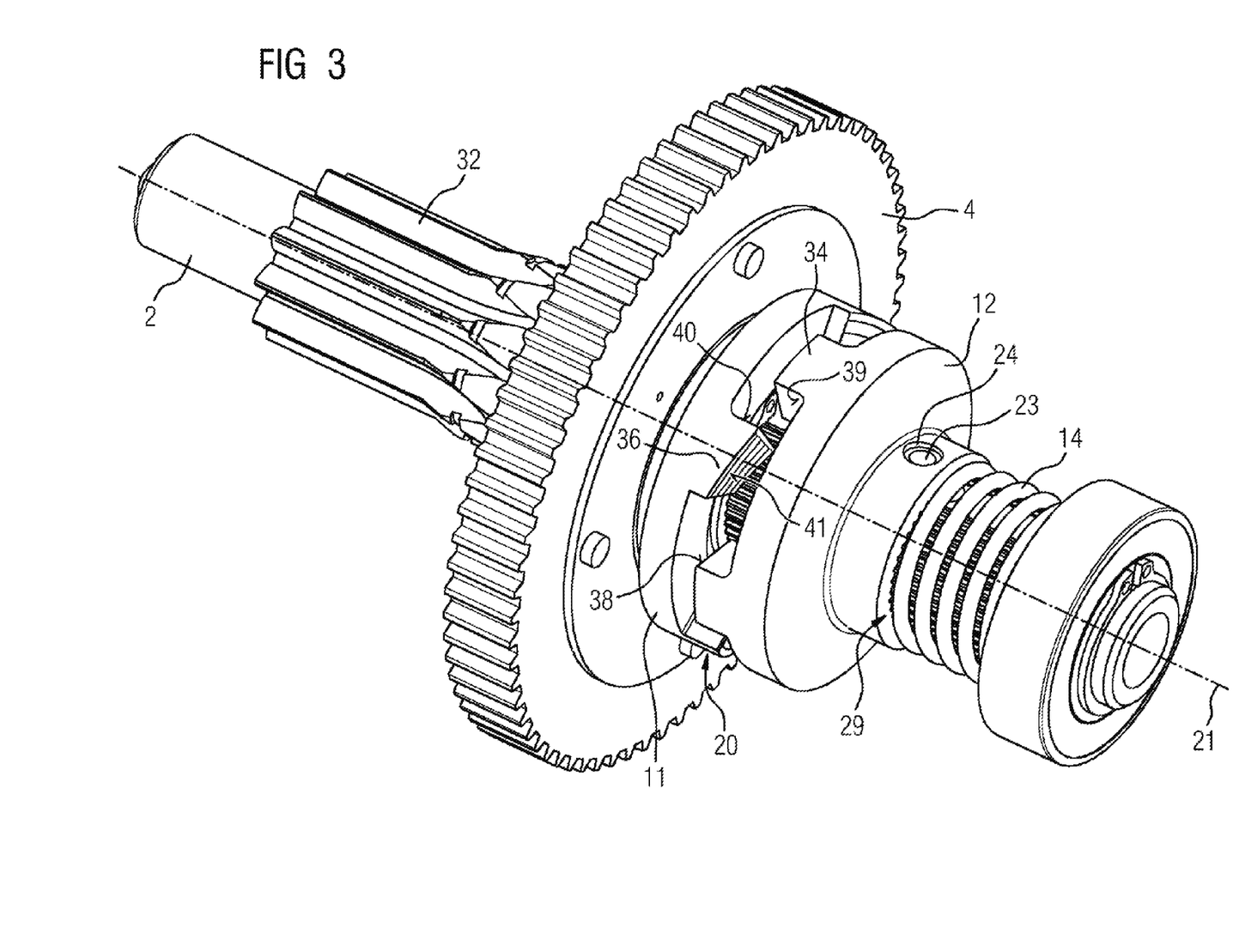
FIG. 3 shows a perspective illustration of an intermediate shaft, an intermediate gear and an open dog clutch.
Figure 4:
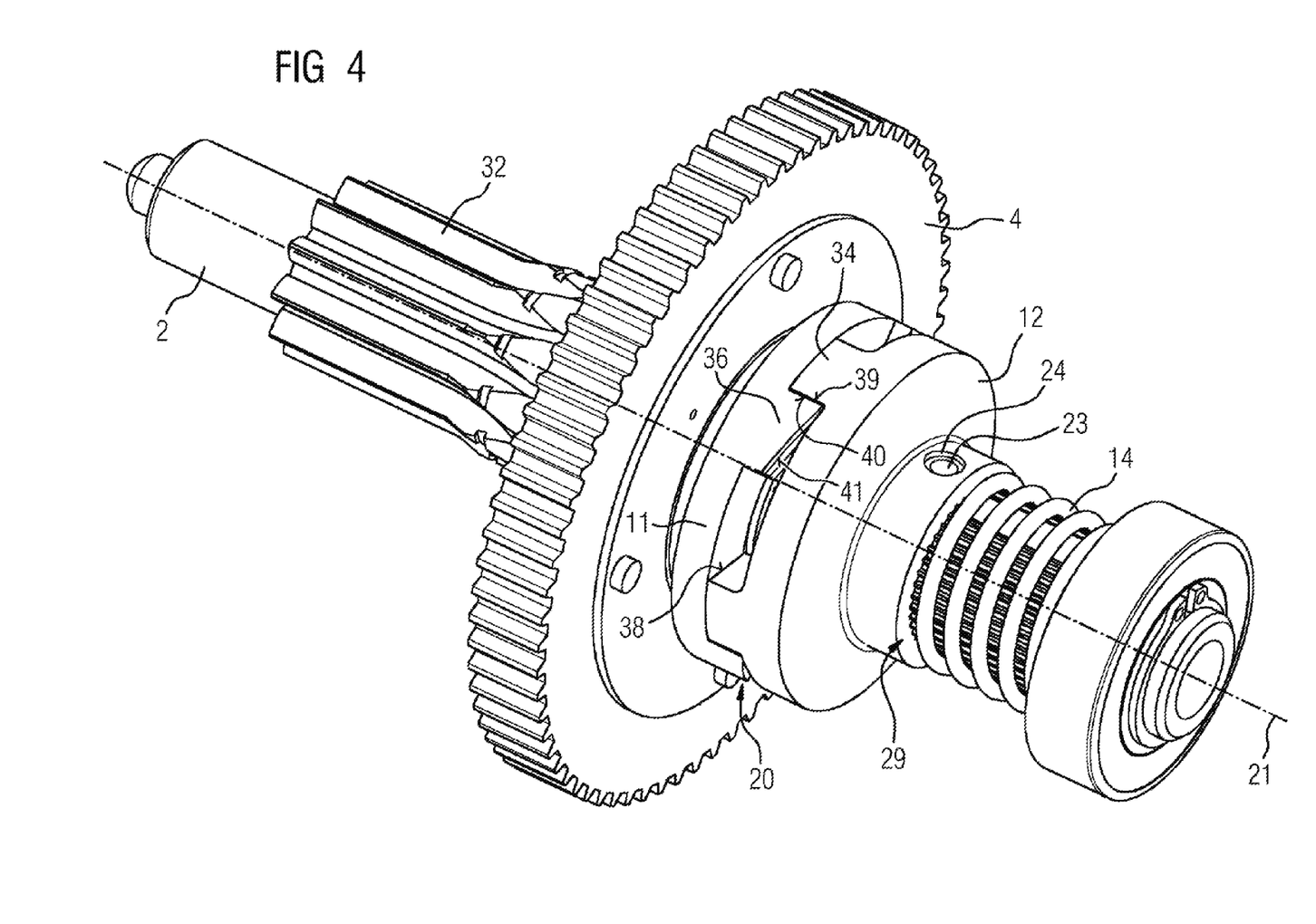
FIG. 4 shows a perspective illustration of an intermediate shaft, an intermediate gear and a closed dog clutch.

In order to couple the first clutch block 12 to the intermediate shaft 2 axially displaceably and fixedly so as to rotate with it, the first clutch block 12 and the intermediate shaft 2 have a spline system 29 (see FIGS. 3 and 4).

In order to displace the first clutch block 12 from its first end position into the second end position, the intermediate shaft 2 has a slot-like transverse opening 22 in the region of the first clutch block 12, which transverse opening 22 runs perpendicularly with respect to the rotational axis 21 through the intermediate shaft 2. A coupling element 23 which is connected to the first clutch block 12 is guided through the transverse opening 22, which coupling element 23 can be displaced in the transverse opening 22 between a first position which defines the first end position of the first clutch block 12 and a second position which defines the second end position of the first clutch block 12. In the exemplary embodiment which is shown in the figures, the coupling element 23 is configured as a tube, the ends of which protrude into recesses 24 in the first clutch block 12. As an alternative, however, the coupling element 23 can also be configured, for example, as a bolt.

Furthermore, the intermediate shaft 2 has a longitudinal opening 25 which runs along its rotational axis 21 and extends from the transverse opening 22 to a tensioning gear-side end of the intermediate shaft 2. A switching pin 10 is mounted in the longitudinal opening 25 such that it can be displaced axially, which switching pin 10 has a resetting end 26, which protrudes out of the longitudinal opening 25, and extends in the longitudinal opening 25 as far as the coupling element 23.

A resetting element 8 which displaces the resetting end 26 of the switching pin 10 toward the longitudinal opening 25 in the tensioned state of the accumulator spring is arranged on the tensioning gear 9. The resetting element 8 has a contact end which projects radially from the tensioning gear 9 and has a contact face 27 which bears against the resetting end 26 of the switching pin 10 in the case of the displacement of the latter. The resetting element 8 is arranged, for example, on the tensioning gear 9 at a position in which the contact face 27 makes contact with the resetting end 26 of the switching pin 10 if the tensioning gear 9 has rotated further by approximately three degrees after the tensioning shaft 18 has reached the top dead center.

Furthermore, a restoring spring 14 is coupled to the first clutch block 12, which restoring spring 14 runs helically around the intermediate shaft 2. The restoring spring 14 acts on an end of the first clutch block 12, which end faces away from the second clutch block 11, and exerts a spring force on the first clutch block 12 in the direction of the second clutch block 11.

Moreover, the tensioning mechanism 1 has a locking mechanism 28 for releasably locking the tensioning gear 9 in the tensioned state of the accumulator spring. The locking mechanism 28 of the exemplary embodiment which is shown in the figures has a cam disk roller 5, which is arranged on the cam disk 17, and a pawl 6 which fixes the cam disk roller 5 in order to lock the tensioning gear 9. After the disconnection of the clutch blocks 11, 12, the cam disk roller 5 runs against the pawl 6 and is locked in said position by the pawl 6, for example when the tensioning gear 9 has rotated further by approximately ten degrees after the tensioning shaft 18 has reached the top dead center. As a result, rebounding of the cam disk roller 5 from the pawl 6 is made possible by way of the open dog clutch 20, and therefore stressing of the freewheel 3 is prevented.

In the tensioned state of the accumulator spring, the intermediate shaft 2 and components which are coupled to it, such as the pawl 6 and the cam disk roller 5, are decoupled from the intermediate gear 4 by way of the dog clutch 20 in a way which will be described in greater detail below, in order not to be loaded and stressed by way of the intermediate gear 4, for example in the case of the tensioning motor continuing to run. As a result, in particular, the loading of the pawl 6, the cam disk roller 5 and the freewheel 3 is advantageously reduced, and wear or damage of said components of the tensioning mechanism 1 as a result of said loading is prevented.

In order to release the energy which is stored in the tensioned accumulator spring, the coupling of the pawl 6 to the cam disk roller 5 is released. The accumulator spring which is relieved rotates the tensioning gear 9 in the same rotational direction as in the case of tensioning of the accumulator spring, as a result of which the resetting element 8 releases the switching pin 10 again and the first clutch block 12 is pushed by way of the restoring spring 14 to the second clutch block 11, with the result that the dog clutch 20 is closed again. As a result, the tensioning mechanism 1 is ready for renewed tensioning of the accumulator spring.

FIGS. 3 and 4 show perspective illustrations of the intermediate shaft 2, the intermediate gear 4 and the dog clutch 20. Here, FIG. 3 shows the first clutch block 12 in an intermediate position which lies between its two end positions and in which the dog clutch 20 is open, and FIG. 4 shows the first clutch block 12 in the first end position, in which the dog clutch 20 is closed.

The first clutch block 12 has four first dogs 34 which face the second clutch block 11, and are arranged around the intermediate shaft 2 equidistantly with respect to one another and at an identical spacing from the rotational axis 21. In the first end position (shown in FIG. 4) of the first clutch block 12, the first dogs 34 bear against the second clutch block 11 in each case with a front face 38 which faces the second clutch block 11 and is perpendicular with respect to the rotational axis 21.

The second clutch block 11 has four second dogs 36 which face the first clutch block 12, and are likewise arranged around the intermediate shaft 2 equidistantly with respect to one another and at the same spacing from the rotational axis 21 as the first dogs 34.

In the intermediate position (shown in FIG. 3) of the first clutch block 12, each second dog 36 protrudes into an intermediate space between two first dogs 34 which are adjacent with respect to it, and has a stop face 40 for one of said two first dogs 34, against which stop face 40 a side face 39 of said first dog 34 bears in the case of a rotation of the first clutch block 12 with respect to the second clutch block 11 in a first rotational direction about the rotational axis 21. As a result, the second dogs 34 prevent a further rotation of the first clutch block 12 with respect to the second clutch block 11 in the first rotational direction after the first dogs 34 have come into contact in each case with a second dog 36. In this way, rotations of the two second clutch blocks 11, 12 in the first rotational direction are already synchronized before the first clutch block 12 reaches its first end position. Moreover, the first dogs 34 always come into contact in each case laterally and flatly against a second dog 36, with the result that no edge of a dog 34, 36 collides with another dog 34, 36 here, which would lead to wear of the dogs 34, 36.

Furthermore, each second dog 36 forms a ramp for the other one of the two first dogs 34 which are adjacent with respect to it, on which ramp said first dog 34 can slide in the case of a rotation of the first clutch block 12 with respect to the second clutch block 11 in a second rotational direction about the rotational axis 21, which second rotational direction is opposed to the first rotational direction. The ramp is formed by an oblique face 41 which faces the first clutch block 12, is inclined with respect to the front faces 38 of the first dogs 34, and rises toward the first clutch block 12 in the second rotational direction. As a result, a rotation of the first clutch block 12 with respect to the second clutch block 11 in the second rotational direction is made possible, in the case of which all the first dogs 34 can run at the same time in each case over an oblique face 41, the first clutch block 12 being displaced in the direction of the second end position counter to the spring force of the restoring spring 14. After the first dogs 34 have passed in each case one oblique face 40, the first clutch block 12 is pressed in the direction of the second clutch block 11 again by way of the spring force of the restoring spring 14. As a result, in particular, a rotation of the second clutch block 11 is made possible which is caused by way of the tensioning motor continuing to run when the tensioning gear 9 is locked by way of the locking mechanism 28 after the tensioning of the accumulator spring and the first clutch block 12 is therefore also fixed.

Although the invention has been illustrated and described in greater detail by way of preferred exemplary embodiments, the invention is not restricted by way of the disclosed examples, and other variations can be derived herefrom by a person skilled in the art, without departing from the scope of protection of the invention.

The invention claimed is:

1. A tensioning mechanism for tensioning an accumulator spring of a spring stored energy mechanism, the tensioning mechanism comprising:
   a tensioning gear coupled to the accumulator spring;
   an intermediate shaft coupled to said tensioning gear;
   an intermediate gear to be driven by a tensioning motor;
   a freewheel coupled to said intermediate gear; and
   a dog clutch disposed to couple said freewheel to said intermediate shaft in order to tension the accumulator spring and to decouple said freewheel from said intermediate shaft in a tensioned state of the accumulator spring;
   said dog clutch having a first clutch block fixedly coupled to said intermediate shaft so as to rotate with said intermediate shaft and a second clutch block connected to said freewheel;
   said first clutch block being displaceable between two end positions along a rotational axis of said intermediate shaft, and having a plurality of first dogs which face toward said second clutch block and are arranged around said intermediate shaft;
   said second clutch block having a plurality of second dogs facing toward said first clutch block; and
   said first clutch block being configured to assume an intermediate between the two end positions, and in the intermediate position of said first clutch block, each of said second dogs protruding into an intermediate space between two adjacent first dogs, having a stop face for one of said two adjacent first dogs, on which stop face a side face of said first dog bears when said first clutch block is rotated with respect to said second clutch block in a first rotational direction about the rotational axis, and forming a ramp for another of said two adjacent first dogs, on which ramp said first dog slides when said first clutch block is rotated with respect to said second clutch block about the rotational axis in a second rotational direction opposite the first rotational direction; and
   a coupling element connected to said first clutch block and guided through a transverse opening in said intermediate shaft, said transverse opening running perpendicularly with respect to the rotational axis of said intermediate shaft, and said coupling element being displaceable in said transverse opening parallel to the rotational axis of said intermediate shaft between a first position, defining one of said two end positions of said first clutch block, and a second position, defining another of said two end positions of said first clutch block.

2. The tensioning mechanism according to claim 1, wherein said first dogs are arranged equidistantly with respect to one another and at an identical spacing from the rotational axis, and wherein said second dogs are arranged equidistantly with respect to one another and at the same spacing from the rotational axis as said first dogs.

3. The tensioning mechanism according to claim 1, wherein said first clutch block has four first dogs, and said second clutch block has four second dogs.

4. The tensioning mechanism according to claim 1, wherein said coupling element is a tube or a bolt having a longitudinal axis extending perpendicularly with respect to the rotational axis of said intermediate shaft, and having ends protruding into recesses formed in said first clutch block.

5. The tensioning mechanism according to claim 1, further comprising a switching pin displaceably mounted in a longitudinal opening in said intermediate shaft and coupled to said coupling element, said longitudinal opening running along the rotational axis of said intermediate shaft.

6. The tensioning mechanism according to claim 5, wherein said switching pin has a resetting end protruding out of said longitudinal opening, and further comprising a resetting element arranged on said tensioning gear, said resetting element displacing said resetting end of said switching pin toward said longitudinal opening in the tensioned state of the accumulator spring, and causing said coupling element to be displaced from the first position to the second position.

7. The tensioning mechanism according to claim 6, wherein said resetting element has a contact end that projects radially from said tensioning gear and a contact face that bears against said resetting end of said switching pin when said switching pin is being displaced.

8. The tensioning mechanism according to claim 1, wherein each of said first and second clutch blocks runs annularly around said intermediate shaft.

9. The tensioning mechanism according to claim 1, further comprising a restoring spring coupled to said first clutch block and configured to exert a spring force on said first clutch block in a direction of said second clutch block.

10. The tensioning mechanism according to claim 1, wherein said freewheel has a freewheel inner ring which runs around said intermediate shaft, and said second clutch block is connected to said freewheel inner ring.

11. The tensioning mechanism according to claim 1, wherein said intermediate gear is configured to be driven via a bevel gear mechanism by way of the tensioning motor.

12. The tensioning mechanism according to claim 1, further comprising a locking mechanism for releasably locking said tensioning gear in the tensioned state of the accumulator spring.

13. The tensioning mechanism according to claim 12, wherein said locking mechanism has a cam disk roller fixedly connected to said tensioning gear, and a pawl fixing said cam disk roller in order to lock said tensioning gear.

14. A spring stored energy mechanism, comprising a tensioning mechanism according to claim 1.

* * * * *